US008341314B2

(12) United States Patent
Muppirala et al.

(10) Patent No.: US 8,341,314 B2
(45) Date of Patent: Dec. 25, 2012

(54) MANAGING I/O REQUEST IN STORAGE SYSTEM

(75) Inventors: Kishore Kumar Muppirala, Karnataka (IN); Satish Kumar Mopur, Karnataka (IN); Dinkar Sitaram, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 56 days.

(21) Appl. No.: 12/731,153

(22) Filed: Mar. 25, 2010

(65) Prior Publication Data

US 2010/0332696 A1 Dec. 30, 2010

(30) Foreign Application Priority Data

Jun. 30, 2009 (IN) .......................... 1540/CHE/2009

(51) Int. Cl.
*G06F 3/00* (2006.01)
*G06F 13/00* (2006.01)

(52) U.S. Cl. ......... 710/39; 710/2; 710/5; 710/8; 710/15; 710/22; 710/36

(58) Field of Classification Search .................. None
See application file for complete search history.

(56) References Cited

U.S. PATENT DOCUMENTS

| 7,225,242 | B2 | 5/2007 | Cherian et al. | |
|---|---|---|---|---|
| 7,287,134 | B2 | 10/2007 | Miller et al. | |
| 2004/0194095 | A1* | 9/2004 | Lumb et al. | 718/100 |
| 2004/0243771 | A1* | 12/2004 | Oldfield et al. | 711/151 |
| 2006/0095686 | A1 | 5/2006 | Miller et al. | |
| 2006/0268690 | A1* | 11/2006 | Palecanda | 370/229 |
| 2008/0046609 | A1* | 2/2008 | Shum et al. | 710/33 |

OTHER PUBLICATIONS

Serial ATA Native Command Queuing, Jul. 2003, Intel Corporation & Seagate Technologies, [online, accessed on Jul. 15, 2011], URL: http://www.seagate.com/content/pdf/whitepaper/D2c_tech_paper_intc-stx_sata_ncq.pdf.*
Axboe, Jens, "Deadline scheduler", http://en.wikipedia.or/wiki/Deadline_scheduler, 2002, 1 page.
Gulati, Ajay, et al, "Efficient and Adaptive Proportional Share I/O Scheduling" Nov. 20, 2007, copyright 2007, Hewlett-Packard Development Company, L.P., 13 pages.
Shreedhar, M, et al, "Efficient Fair Queuing Using Deficit Round-Robin", IEEE/ACM Transactions on Networking, vol. 4, No. 3, Jun. 1996, 11 pages.

\* cited by examiner

*Primary Examiner* — Scott Sun

(57) ABSTRACT

The host interface module is configured to receive a plurality of I/O request which includes an associated priority; create an I/O request queue for each associated priority; define a threshold value for the queue length for each of the plurality of I/O request queues; and determine if the queue length for one of the plurality of the I/O request queue corresponding to the associated priority is less than the defined threshold value for the queue length for the one of the plurality of the I/O request queues. If the queue length of the one of the plurality of I/O request queues is more than the defined threshold value for the queue then the host interface module is further configured to rejecting the I/O request and sending a queue full message; wherein the threshold value for the queue length is based on the processing rate of the I/O requests in the plurality of the I/O request queues.

20 Claims, 3 Drawing Sheets

MANAGING I/O REQUEST IN STORAGE SYSTEM

RELATED APPLICATIONS

Benefit is claimed under 35 U.S.C. 119(a)-(d) to Foreign application Serial No. 1540/CHE/2009 entitled "Managing I/O Request in Storage System" by Hewlett-Packard Development Company, L.P., filed on 30 Jun. 2009, which is herein incorporated in its entirety by reference for all purposes.

BACKGROUND

In a storage system Input/Output or I/O request refers to the communication between a storage device and the host system. The host will typically make I/O requests to the data storage subsystems. The inputs are signals or data received by the storage system, and the outputs are signals or data sent by the storage devices. For efficiency each host can accumulate a batch of I/O requests from users and transmit them to the data storage subsystem. When a storage device is serving multiple hosts quality of service (QoS) in terms of performance delivered to the host may vary depending on the overall load on the storage device. There have been multiple implementations to deliver different QoS to different workloads using various scheduling algorithms such as a deadline scheduling algorithm.

BRIEF DESCRIPTION OF THE DRAWINGS

Embodiments of the present invention are illustrated by way of example only and not limited to the figures of the accompanying drawings, in which like references indicate similar elements and in which.

Other features of the present embodiments will be apparent from the accompanying drawings and from the detailed description that follow.

DETAIL DESCRIPTION

A system and method for managing I/O requests in a storage system is described. In the following detailed description of various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
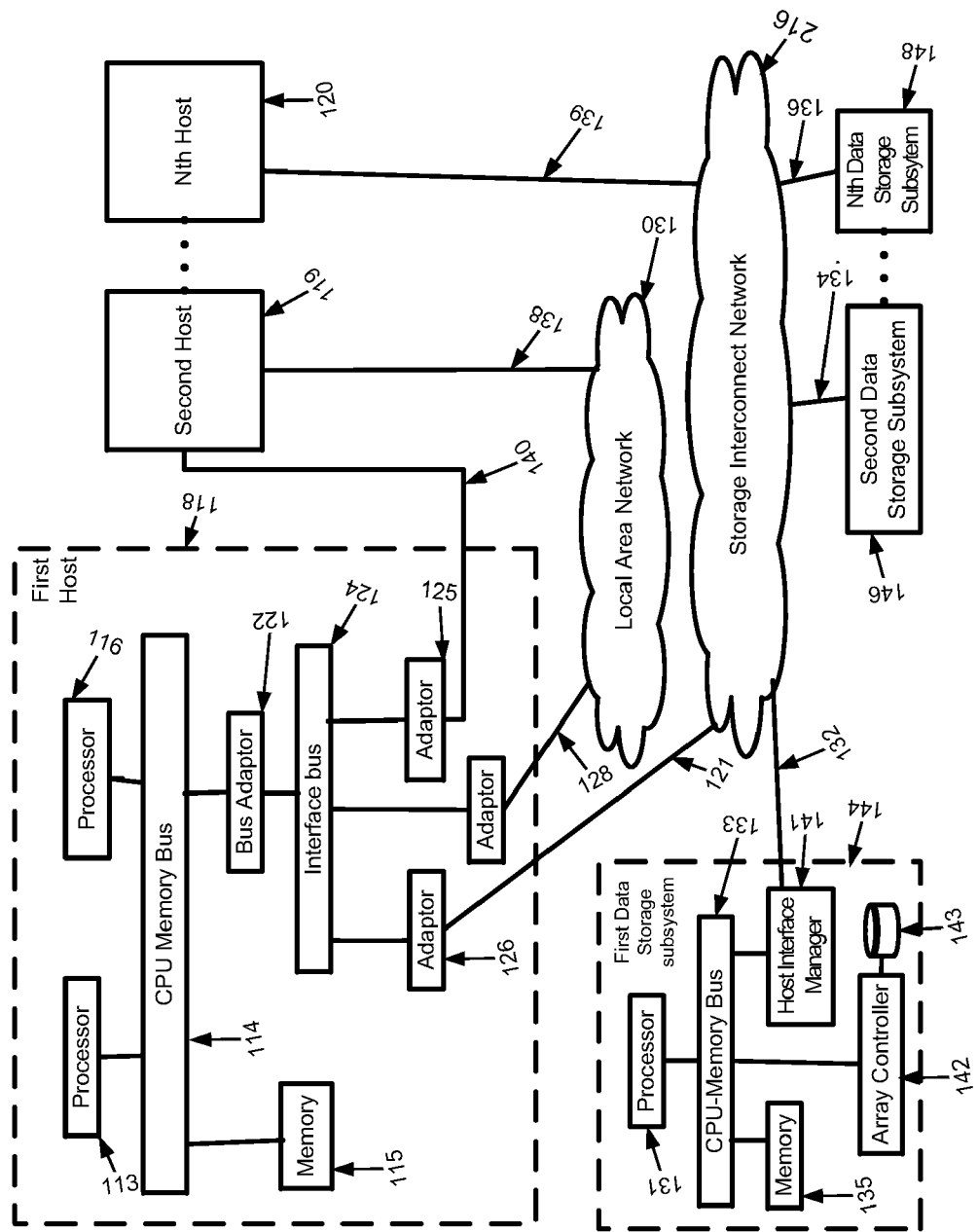
FIG. 1 illustrates a storage system comprising multiple hosts and multiple storage subsystems.

FIG. 1 illustrates a data storage system that includes first through Nth hosts 118, 119 and 120, and first through Nth data storage subsystems 144, 146 and 148. Each host is a computer that can connect to clients, data storage subsystems and other hosts using software/hardware interfaces such as network interface cards and software drivers to implement Ethernet, Fibre Channel, ATM, SCSI, InfiniBand, etc. Each host runs an operating system such as Linux, UNIX, a Windows OS, or any suitable operating system.

FIG. 1 shows the first host 118 includes a CPU-memory bus 114 that communicates with the processors 113 and 116 and a memory 115. The type of processors used are not essential to the invention and could be any suitable general-purpose processor such as an Intel Pentium processor, an ASIC dedicated to perform the operations described herein, or a field programmable gate array (FPGA). Each host includes a bus adapter 122 between the CPU-memory bus 114 and an interface bus 124, which in turn interfaces with network adapters 117, 125 and 126.

The first host 118 communicates through the network adapter 125 over a link 140 with a second host 119. The first host 118 can also communicate through the network adapter 117 over link 128 with the local area network (LAN) 130. The first host 118 also communicates through a host bus adapter 126 over a link 121 with a storage interconnect network 129. Similarly, the second host 119 communicates over links 138 and 139 with the LAN 130 and the storage interconnect network 129, respectively. The storage interconnect network 129 also communicates over links 132, 134, and 136 with the data storage subsystems 144, 146, and 148, respectively.

In sum, the hosts 118, 119 and 120 communicate with each other, the LAN 130 and storage interconnect network 129 and data storage subsystems 144, 146, and 148. The LAN 130 and the storage interconnect network 129 can be separate networks as illustrated or combined in a single network, and may be any suitable known bus, SAN, LAN, or WAN technology such as Fibre Channel, SCSI, InfiniBand, or Ethernet, and the type of interconnect is not essential to the invention.

FIG. 1 illustrates the first data storage subsystem 144 which includes a CPU-memory bus 133 that communicates with the processor 131 and a memory 135. The type of processor 131 used is not essential to the invention and could be any suitable general-purpose processor such as an Intel Pentium processor, an ASIC dedicated to perform the operations described herein, or a field programmable gate array (FPGA). The CPU-memory bus 133 also communicates through an adapter and link 132 with the storage interconnect network 129 and an array controller 142, interfacing with an array of storage disks, wherein the array controllers disks form a disk array 143. In an alternative embodiment, any other suitable storage devices can replace the disk arrays such as an array of tape drives or an array of nonvolatile semiconductor memory.

A host may access secondary storage (e.g., disk drives) through a LUN (logical unit number) that abstracts the physical disk(s) as a linear array of fixed-size blocks. A logical block address (LBA) identifies each fixed-sized block. The data storage system constructs a LUN from all or parts of several physical storage devices such as disk drives. To make a large LUN, a data storage system may concatenate space allocated from several storage devices. To improve performance, the data storage system maps adjacent regions of LUN space onto different physical storage devices (striping).

In operation, a user requests an I/O operation of one of the hosts 118, 119, or 120 which will transmit the request on the LAN 130 or the storage interconnect network 129 to one of the data storage subsystems 144, 146, or 148. If a write is received, the data storage subsystem 144 can use a write-through scheme and not acknowledge the write until the data is written to storage disks (e.g., disk array 143). This ensures data consistency between the host and data storage subsystem in the event of a power failure, etc. In a write-back scheme, the data storage subsystem 144 can acknowledge the write before data is written to a disk array 143 as long as the data is stored in another form of nonvolatile memory (e.g., battery backed RAM) until written to the storage disks to again ensure data consistency.

According to an example embodiment, the storage subsystem may comprise a host interface manager (HIM) 141 and a cache module. The HIM 141 may manage the request to/from the host device that access the LUNs presented by the storage array. The cache module may be used to improve the performance of read and write requests from the host device. The HIM 141 may receive the I/O request from the host devices and send back responses and data.

Figure 2:
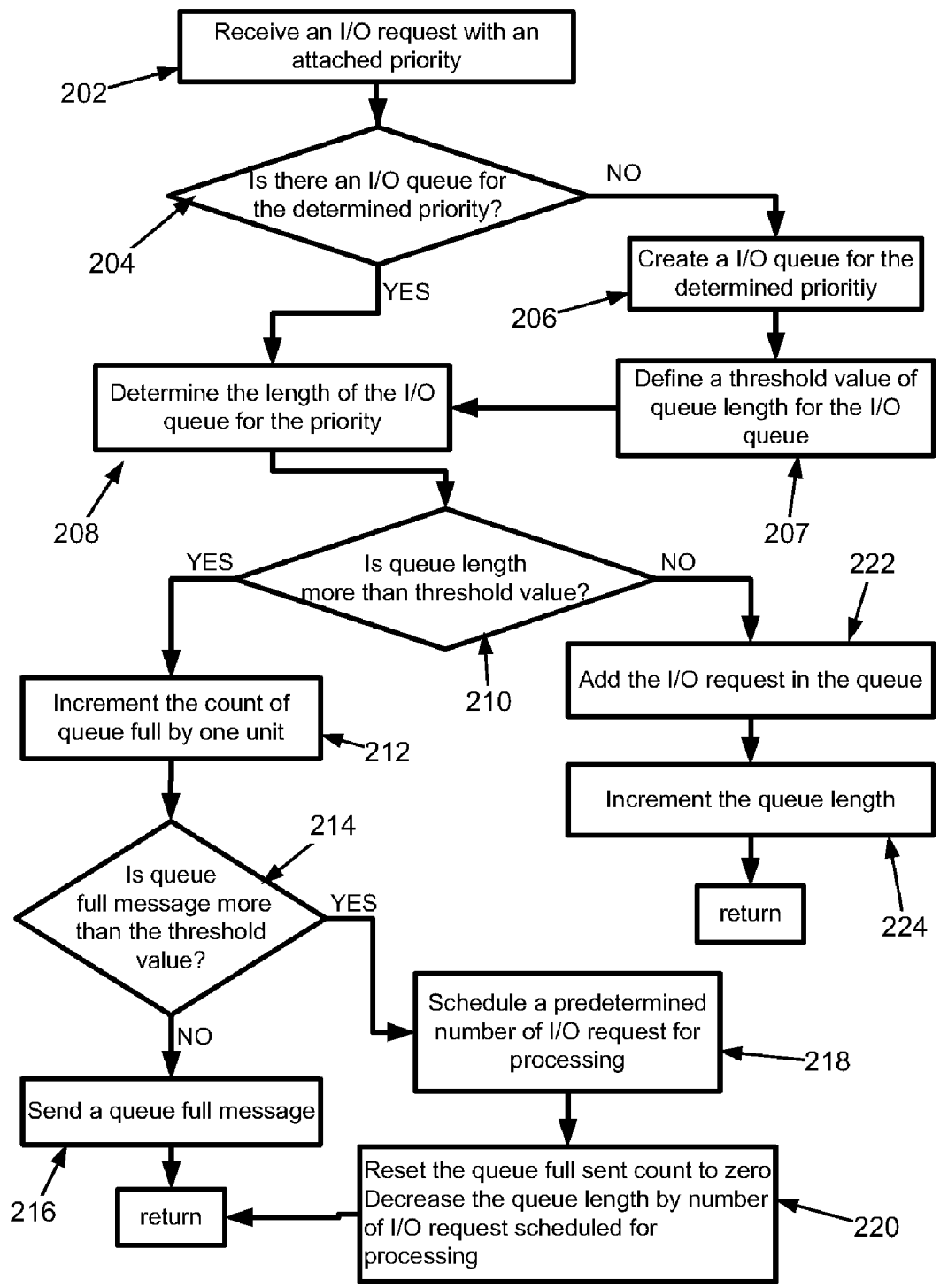
FIG. 2 illustrates the steps of a method for managing I/O requests in a storage system.

FIG. 2 illustrates the steps of a method for managing I/O requests in a storage system. The proposed method may deliver better performance by differentiation among the I/O request it is servicing. When an I/O request arrives at the host interface module, the HIM will process the I/O request in one of the following ways: (1) the HIM will reject the I/O request with a busy status to the host; and (2) the HIM will accept the I/O request for processing if it is not busy and the priority of the I/O request is sufficient. After processing is complete the HIM will transmit completion status to the host.

Referring to FIG. 2, the method starts at step 202 when the host interface manager receives an I/O request, for example, from a host. The I/O request may comprise a priority attached to it. The priority for the I/O request may be assigned by the storage system administrator. The priority may be assigned based on the type of application, for instance a backup, a document production, and a transaction processing. The priority is attached with the I/O request when created at the host device level. The priority may be assigned as absolute priority (Po, P1, P2 wherein Po is highest) in terms of numerical values or relative priority like high, medium or low.

At step 204 of FIG. 2, the host interface manager may determine the priority attached with the received I/O request. The host interface manager may further determine if there is an I/O request queue created for the determined priority. If there is no I/O request queue for the determined priority, the HIM at step 206, will create an I/O request queue. The I/O request queue may be stored in a memory on the storage subsystem. If at step 204, there is an existing I/O request queue for the determined priority, the method may proceed to step 208. According to an example embodiment an I/O queue is created for each priority and stored on the storage subsystem. The I/O queue for each priority may be created by the storage system administrator. According to an example embodiment a predetermined number of I/O request queues may be created by the administrator based on the predetermined priorities assigned to the I/O requests.

At step 207 of FIG. 2 a threshold value for the queue length is defined for each I/O request queue. A threshold value of queue length is the maximum queue length of an I/O request queue after which the I/O request queue may not accept any other I/O request for processing. The queue length for an I/O request queue is the number of I/O requests which are pending in the I/O queue to be processed. The queue length may be represented as a numerical value (n0, n1, n2, for example) and may be monitored by the HIM. The threshold value for the queue length is tunable and may be predetermined by the administrator of the storage system. The threshold value for the queue length may be stored in a memory on the storage subsystem and may be represented by a numerical value (No, N1, N2, for example).

According to an example embodiment the threshold value of the queue length is based on the service rate of the I/O request of the I/O request queues. A service rate of the queue is the rate of the I/O request processing for the queue. An I/O request queue with a high service rate may have higher value of the threshold for the queue length compared with that of an I/O request queue with low processing rate. This may ensure that a lower priority queue is not permitted to increase its resource consumption beyond a level where it may threaten the performance commitment for higher priority queues. The threshold value for a queue length may be determined according to the following empirical formulae $$QfullThreshold_i = DeviceCapacity - \sum_{j=i+1}^{N} ProcessingRate_j$$

wherein N is the total number of queues;
DeviceCapacity is the maximum I/O requests that can be held pending in the device for processing; and
Processing Rate is the rate at which the I/O requests are processed for each queue.

According to an example embodiment, the processing rate of a queue is based on the resources assigned to the queue. Accordingly the threshold value of the queue length may be determined based on the resources available for the queue, such as the size of a cache memory. The host interface manager, the cache memory and storage disk may run out of resources resulting in the I/O request waiting. The host interface manager after reaching a limit on the resources usage may indicate the device overload to the hosts by sending queue full messages. Since each pending I/O request to be processed consumes resources in the HIM, if a lower priority I/O request swamps the device, even though these I/O requests are not serviced by the HIM in view of lower priority, the HIM resources are blocked in the backlog entries in the queue of the lower priority I/O requests.

As an example if the HIM has a capacity of 600 I/O request simultaneously and there are two hosts sending 10 I/O requests per second to the HIM and the HIM is processing 10 I/O requests from a high priority queue and 5 I/O requests for a low priority queue per second. The queue length threshold for a higher priority queue may be 400 and the queue length threshold for a lower priority queue may be 200. Thus at the end of 40 seconds, the HIM will accumulate 200 I/O requests for the second, lower priority, workload and return a queue full message to the host device. The HIM will be accepting I/O requests of low priority from the hosts only after some of the low priority I/O are processed. The HIM, however, will continue to accept high priority I/O requests.

At step 208 of FIG. 2, after receiving the I/O request, the host interface manager may determine the queue length of the I/O request queue for the priority attached with the I/O request. At step 210, the host interface manager may determine if the queue length of the I/O request queue for the priority attached with the I/O request is more than the threshold value for the queue length. At step 212 of FIG. 2, the HIM may increment the value of the queue full message for the I/O request queue by one.

According to an example embodiment the host interface manager may maintain a count for the queue full messages sent by it for each I/O queue. The queue full message count may be maintained in the memory on the storage subsystem and may be represented in form of a numerical value (for example, q0, q1, q2). According to an example embodiment, the storage system administrator may define a threshold value for the queue full messages for each queue. The repeated queue full messages may be sent to a host for a low priority I/O requests under conditions wherein a high priority queue has a high throughput. The threshold value may comprise the maximum number of queue full messages which may be sent for the I/O request for a priority and may be empirically determined. The threshold value for each queue is dynamically tunable through a configuration process and can be changed by the administrator. The threshold value may be stored in a memory on the host interface manager and may be represented by a numerical value (for example, Q0, Q1, Q2).

At step 214, the host interface manager may determine if the number of queue full messages for the I/O request queue is more than or equal to the threshold value. If the number of queue full messages for the queue is not more than the threshold value for the queue, the host interface manager may at step 216, may not accept the I/O request and send a queue full message to the host. After sending the queue full message the HIM may return to service the next I/O request.

At step 218, if the number of queue full messages for the queue is more than or equal to the threshold value for the queue, the host interface manager may schedule a predetermined number of I/O requests from the I/O request queue for processing. The number of I/O requests to be scheduled for processing is dynamically tunable and may be determined by the storage system administrator. The number of I/O requests to be scheduled for processing may be empirically determined. At step 218, the host interface manager, after scheduling I/O requests for processing, may reset the count of queue full messages for the queue to zero and return to service the next I/O request. The host interface manager may reduce the queue length of the queue by the number of I/O requests scheduled for processing. The host interface manager may return to service the next I/O request.

At step 222, if the queue length of the queue for the priority attached with the I/O request is less than the threshold value for that queue, the host interface manager may add the I/O request in the I/O queue. At step 224, the host interface manager may increment the value of queue length by one unit and send an acknowledgement to the host for the acceptance of the I/O request. The host interface manager may return to service the next I/O request.

According to an example embodiment a lookup table may be created for managing the I/O requests in the storage systems. The lookup table may comprise a column for priority (Pi), a column for queue length (ni), a column for threshold value of the queue length (Ni), a column for queue full messages (qi) and a column for threshold value of the queue full messages (Qi). A row may be created for each different priority I/O request received by the host interface manager. The corresponding columns of threshold value for queue length and threshold value for queue full messages for each row may be populated by the storage system administrator. The corresponding columns for queue length and queue full messages may be updated by the host interface manager for each I/O request received at it. An example of the lookup table is reproduced below:

| Priority (Pi) | Queue Length (ni) | Threshold value for queue length (Ni) | Queue full message (qi) | Threshold value for queue full messages (Qi) |
|---|---|---|---|---|
| P0 | n0 | N0 | q0 | Q0 |
| P1 | n1 | N1 | q1 | Q1 |
| P2 | n2 | N2 | q2 | Q2 |
| ... | ... | ... | ... | ... |
| ... | ... | ... | ... | ... |
| ... | ... | ... | ... | ... |

The above described method for managing I/O requests may fare better in ensuring that the device may be loaded to its full capacity while ensuring enough room to service high priority I/O requests. An exemplary pseudo code for the method of managing I/O request in a storage system is reproduced below

```
begin
    if
        queue length for the priority ≧ threshold value of the queue
        length
    then
        // do not process the request on overload
        Consecutive_Q_fulls_sent_for_queue[Workload] ++;
        if (Consecutive_Q_fulls_sent_for_queue <
        Max_Qfull_threshold)
        then
            return Queue Full or Busy condition back to the host;
        else
        schedule a pre-specified number (for this queue) of I/O requests
        from this queue;
            Consecutive_Q_fulls_sent_for_queue = 0;
        endif
    endif
    // regular processing of the request
end
```

Figure 3:
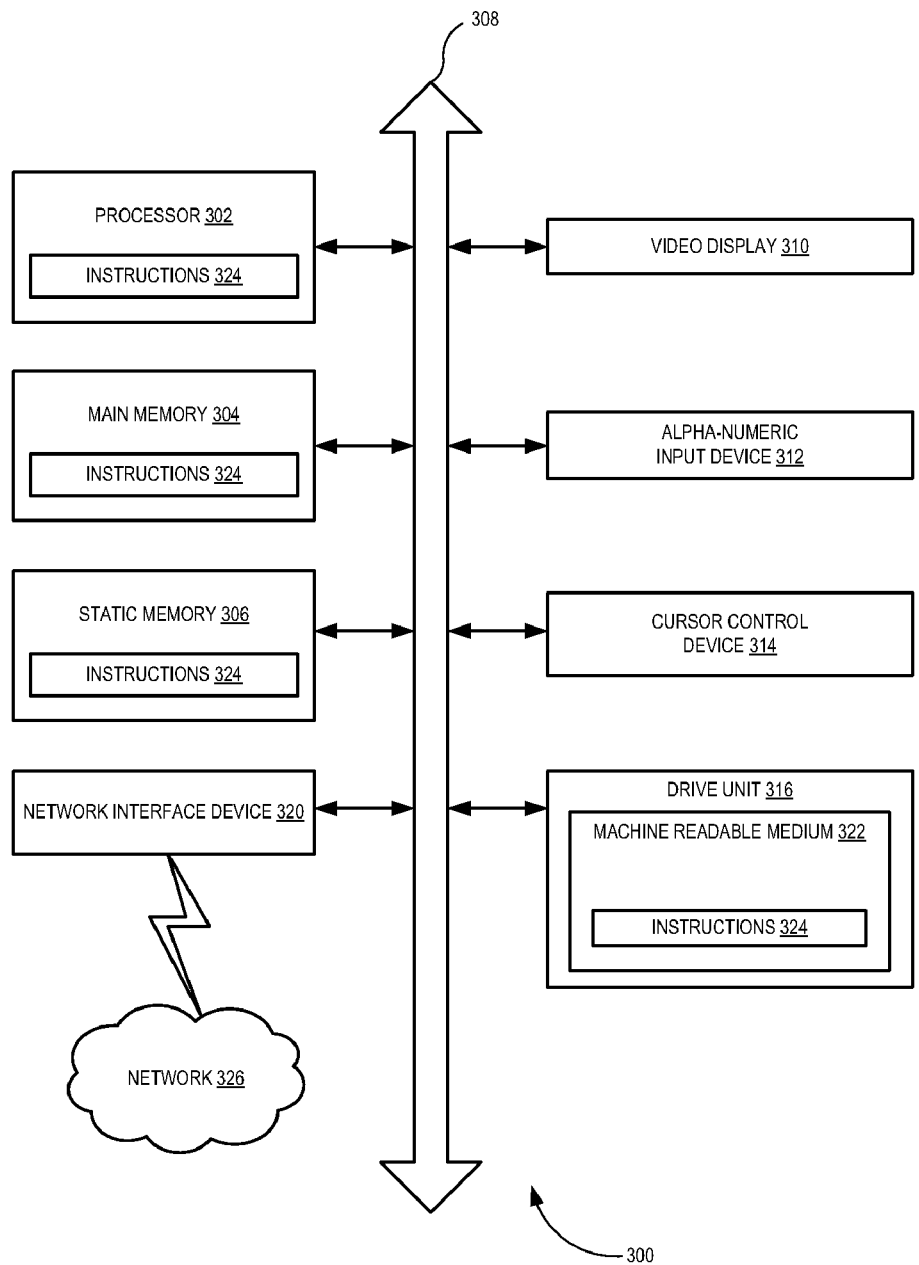
FIG. 3 is a diagrammatic system view of a data processing system in which any of the embodiments disclosed herein may be performed, according to one embodiment.

FIG. 3 is a diagrammatic system view 300 of a data processing system in which any of the embodiments disclosed herein may be performed, according to one embodiment. Particularly, the diagrammatic system view of FIG. 3 illustrates a processor 302, a main memory 304, a static memory 306, a bus 308, a video display 310, an alpha-numeric input device 312, a cursor control device 314, a drive unit 316, a signal generation device 318, a network interface device 320, a machine readable medium 322, instructions 324 and a network 326.

The diagrammatic system view 300 may indicate a personal computer and/or a data processing system in which one or more operations disclosed herein are performed. The processor 302 may be a microprocessor, a state machine, an application specific integrated circuit, a field programmable gate array, etc. The main memory 304 may be a dynamic random access memory and/or a primary memory of a computer system. The static memory 306 may be a hard drive, a flash drive, and/or other memory information associated with the data processing system.

The bus 308 may be an interconnection between various circuits and/or structures of the data processing system. The video display 310 may provide graphical representation of information on the data processing system. The alpha-numeric input device 312 may be a keypad, keyboard and/or any other input device of text (e.g., a special device to aid the physically handicapped). The cursor control device 314 may be a pointing device such as a mouse. The drive unit 316 may be a hard drive, a storage system, and/or other longer term storage subsystem. The network interface device 320 may perform interface functions (e.g., code conversion, protocol conversion, and/or buffering) required for communications to and from the network 326 between a number of independent devices (e.g., of varying protocols). The machine readable medium 322 may provide instructions on which any of the methods disclosed herein may be performed. The instructions 324 may provide source code and/or data code to the processor 302 to enable any one or more operations disclosed herein.

It will be appreciated that the various embodiments discussed herein may not be the same embodiment, and may be grouped into various other embodiments not explicitly disclosed herein. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Although the present embodiments have been described with reference to specific embodiments, it will be evident that various modifications and changes may be made to these embodiments without departing from the broader spirit and scope of the various embodiments. For example, the various devices, described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuits (ASIC)).

The invention claimed is:

1. A method of managing I/O requests in a storage system, wherein each one of a plurality of I/O request includes an associated priority, the method comprising steps of:
   receiving an I/O request with the associated priority;
   creating an I/O request queue for each priority and defining a threshold value for queue length wherein the queue length is a number of I/O requests pending for processing in the I/O queue;
   determining a queue length for one of a plurality of I/O request queues having a priority that matches the associated priority;
   determining if the queue length is less than the threshold value defined for the one of the plurality of the I/O request queues; and
   when the queue length is more than the threshold value for the queue length for one of the plurality of the I/O request queues then rejecting the I/O request and sending a queue full message;
   wherein the threshold value of the queue length is defined based on a processing rate of the I/O requests in each of the plurality of the I/O request queues.

2. The method of claim 1 wherein the threshold value for the queue length for an I/O request queue is calculated as $$QfullThreshold_i = DeviceCapacity - \sum_{j=i+1}^{N} ProcessingRate_j.$$

3. The method of claim 1 further comprising when the queue length is less than the threshold value of the queue length for the one of the plurality of I/O request queues then accepting the I/O request.

4. The method of claim 1 wherein the storage system is a storage area network (SAN).

5. The method of claim 1 further comprising:
   maintaining a count of the number of queue full messages sent for each of the plurality of I/O request queues;
   incrementing the number of queue full messages sent by one for each queue full message sent; and
   when the number of the queue full messages sent for one of the plurality of I/O request queues is more than or equal to a threshold value for a number of queue full messages for one of the plurality of I/O request queues then scheduling a predetermined number of I/O requests from the one of the plurality of I/O request queues for processing.

6. The method of claim 5 further comprising resetting the count of the number of the queue full messages sent to zero when the number of queue full messages sent is more than or equal to the threshold value for a number of queue full messages.

7. The method of claim 5 wherein the predetermined number of I/O requests for processing may be determined by a storage system administrator.

8. A storage subsystem comprising:
   a host interface module, coupled to a disk array, configured to:
      receive a plurality of I/O requests, wherein each one of the plurality of I/O requests includes an associated priority;
      create an I/O request queue for each different associated priority;
      define a threshold value for the queue length for each one of the plurality of I/O request queues, wherein the queue length is the number of I/O requests in the I/O queue;
      determine a queue length for one of a plurality of I/O request queues having a priority that matches the associated priority;
      determine, if the queue length, is less than the threshold value defined for the one of the plurality of I/O queues; and
      when the queue length is more than the defined threshold value for the one of the plurality of I/O request queues, then the host interface module is further configured to reject the I/O request and send a queue full message;
      wherein the threshold value for the queue length is based on a processing rate of the I/O requests in each of the plurality of I/O request queues.

9. The storage system of claim 8 wherein the threshold value for the queue length for each of the plurality of I/O request queues is defined as $$QfullThreshold_i = DeviceCapacity - \sum_{j=i+1}^{N} ProcessingRate_j.$$

10. The storage system of claim 8, further comprising if the queue length is less than the threshold value for that one of the plurality of I/O request queues for the associated priority, then accepting the I/O request.

11. The storage system of claim 8 wherein the storage system is a storage area network (SAN).

12. The storage system of claim 8 wherein host interface module is further configured to:
- maintain a count of the number of queue full messages sent for each of the plurality of I/O request queues;
- increment the number of queue full messages sent by one for each queue full message sent; and
- when the number of the queue full messages sent for one of the plurality of I/O request queues is more than or equal to a threshold value for a number of queue full messages for that one of the plurality of I/O request queues, then schedule a predetermined number of I/O requests from that one of the plurality of I/O request queues for processing.

13. The storage system of claim 12 further comprising resetting the number of the count of queue full messages to zero when the number of queue full messages sent is more than or equal to the threshold value for a number of queue full messages.

14. The storage system of claim 8 wherein the processing rate of an I/O request queue is based on the computing resources associated with the I/O request queue wherein the computing resources may comprise processor, and a cache memory.

15. The storage system of claim 8 wherein the processing includes a read or a write to the disk array.

16. The storage system of claim 12 wherein the predetermined number of I/O requests for processing is determined by a storage system administrator.

17. A computer program product for managing I/O requests in a storage system, the product comprising a computer readable medium having program instructions recorded therein, which instructions, when read by a computer, cause the computer to:
- receiving an I/O request with the associated priority;
- creating an I/O request queue for each priority and defining a threshold value for queue length wherein the queue length is a number of I/O requests pending for processing in the I/O queue;
- determining a queue length for one of a plurality of I/O request queues having a priority that matches the associated priority;
- determining if the queue length is less than the threshold value defined for the one of the plurality of the I/O request queues; and
- when the queue length is more than the threshold value for the queue length for one of the plurality of the I/O request queues then rejecting the I/O request and sending a queue full message;
- wherein the threshold value of the queue length is defined based on a processing rate of the I/O requests in each of the plurality of the I/O request queues.

18. The computer program product of claim 17 wherein the threshold value for the queue length for the I/O request queue is defined as $$QfullThreshold_i = DeviceCapacity - \sum_{j=i+1}^{N} ProcessingRate_j.$$

19. The computer program product of claim 17 wherein the storage system is a storage area network (SAN).

20. The computer program product of claim 17 further comprising
- maintaining a count of the number of queue full messages sent for each of the plurality of I/O request queues;
- incrementing the number of queue full messages sent by one for each queue full message sent; and
- when the number of the queue full messages sent for one of the plurality of I/O request queues is more than or equal to a threshold value for number of queue full messages for one of the plurality of I/O request queues then scheduling a predetermined number of I/O requests from the one of the plurality of I/O request queues for processing.

* * * * *